Nov. 16, 1965  H. W. HALLESY  3,218,087
FOOT SEAL

Filed July 9, 1962  2 Sheets-Sheet 1

INVENTOR.
HAROLD W. HALLESY
BY
Reynolds & Christensen
ATTORNEYS

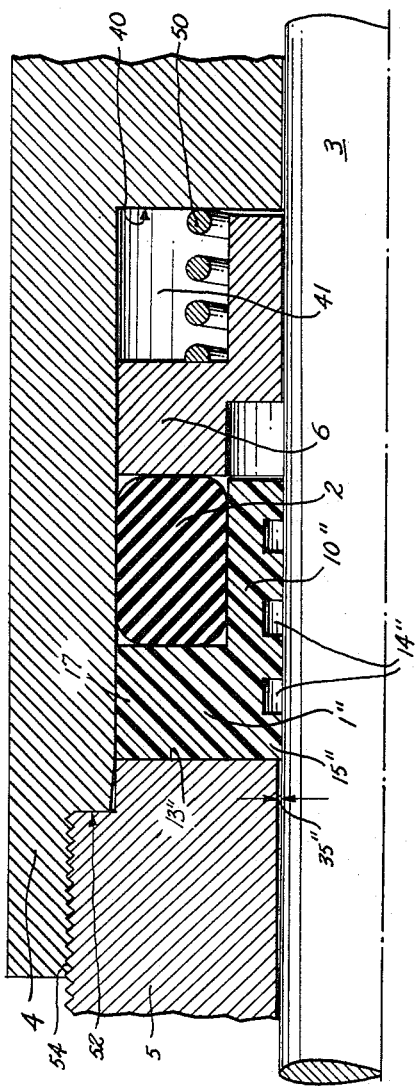
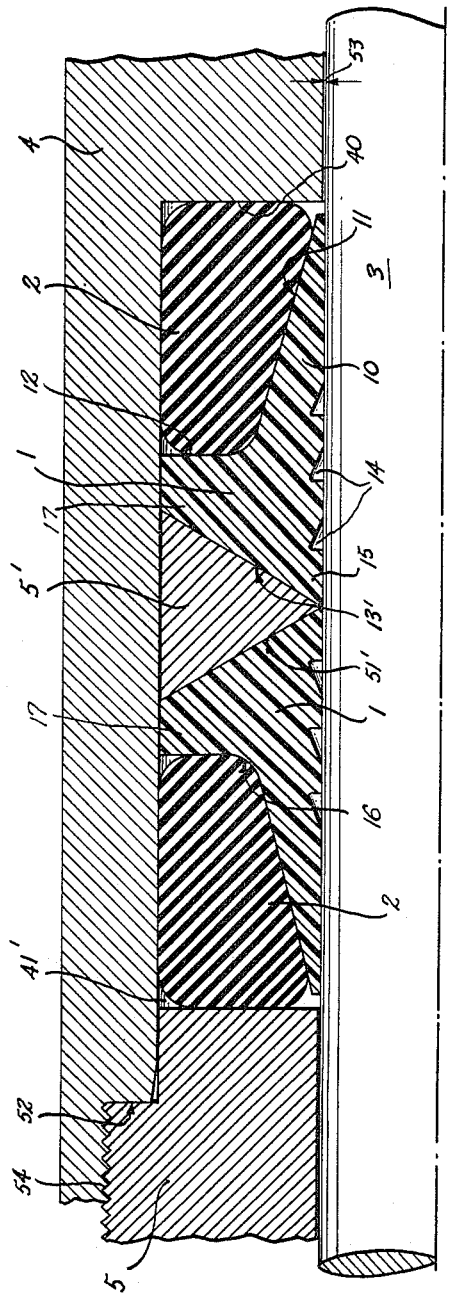

United States Patent Office 3,218,087
Patented Nov. 16, 1965

3,218,087
FOOT SEAL
Harold W. Hallesy, Seattle, Wash., assignor to The Boeing Company, Seattle, Wash., a corporation of Delaware
Filed July 9, 1962, Ser. No. 208,391
2 Claims. (Cl. 277—112)

This invention relates to a seal for use in hydraulic (or pneumatic) actuators, for example, intended for use in actuating controls or the like upon aircraft, the function of such a seal being to prevent leakage of any appreciable amount, over wide ranges of temperature and pressure, and over long periods of time, between a housing and a rod, one of which is movable relatively to the other. Primarily the seal of this invention is designed for use between a housing and a rod which are relatively reciprocable, although it would also be useful as between two such rotatable elements.

The primary object of this invention is to provide such a seal which will have a dependably useful life, under the conditions stated above, and even under quite adverse ambient conditions, in fact, a useful life corresponding to the useful life of the actuator per se. Thereby frequent inspections and occasional replacement of the seal can be eliminated, and when the leakage of the seal becomes excessive, the actuator itself will be so worn that it should be replaced by a new actuator, with a new lifetime seal installed, and the old actuator and its seal can be discarded.

Another object is to provide a sealing structure which is inherently safe against catastrophic failure, such failure being of a type defined hereinafter.

Other objects will appear more fully as this specification proceeds.

The drawings illustrate a presently preferred embodiment of the invention, as applied for example to a rod and housing of a hydraulic actuator such as would be used to effect movement of aircraft controls and the like, where extreme reliability and long life are exceptionally necessary. Alternative forms are also shown.

FIGURE 3 is a view similar to FIGURE 1, but illustrating a somewhat rudimentary form of the seal.

FIGURE 4 is a view similar to FIGURE 1, of a double form of the seal, useful where pressure is applicable at different times at the opposite ends of the seal.

Figure 1:
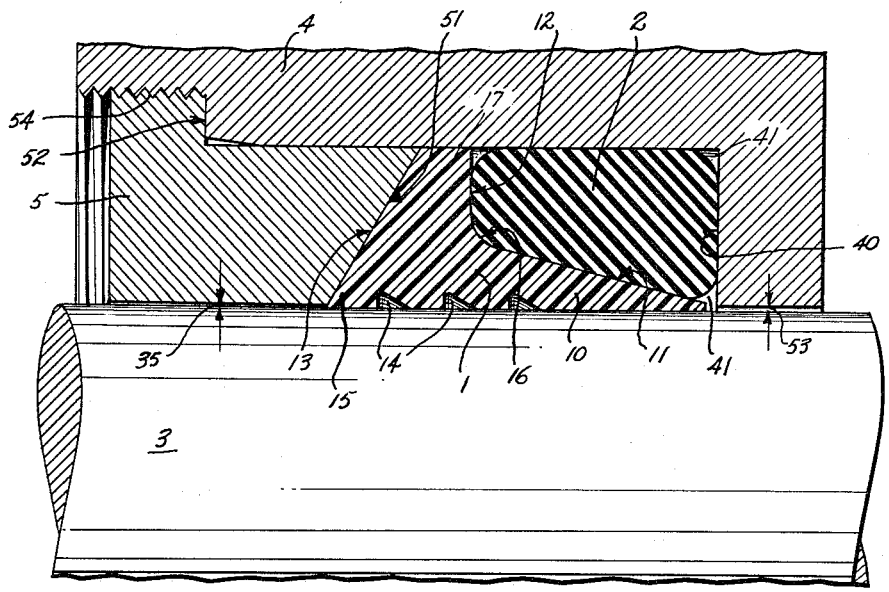
FIGURE 1 is a partial axial sectional view of such a seal structure, in its presently preferred form, illustrating the two rings in relation to a rod and housing.

Seals predominantly used presently in similar situations consist of a standard O-ring of rubber, neoprene, or like elastomeric material, interposed between two back-up rings within a standard groove in a housing; the O-ring constitutes a static seal with respect to the groove and a dynamic seal with respect to the reciprocable rod. Such seals have had a life, in aircraft usage, in the range of 1100 flight-hours. They generally fail because the O-ring tends to extrude into a clearance space, under the influence of pressure, and is pinched off. A modified seal currently in limited usage is a ring of Teflon (a polytetrafluoroethylene polymer, made by E. I. du Pont de Nemours and Company) channel-shaped in cross section and received statically within a grooved member, and with an elastomeric ring of rubber, neoprene, or the like confined and deformed within its channel, and by its inherent elasticity urging the Teflon ring against the member complemental to the grooved member. Such a seal has a useful life of say 3800 flight-hours. Variations of this design have Teflon rings of U, V, or chevron formation, in cross section, with elastomeric rings of common O-ring type, received within the channel of and somewhat deformed by the Teflon ring. In these variations one wing of the Teflon ring constitutes a static seal and its other wing constitutes a dynamic seal.

It has been found that seals of the latter type are lacking in sealing ability after relatively short usage, probably, for one reason, that cold flow to which the Teflon rings are subject is not compensated for by continuing and adequate inherent elasticity of the O-ring, wherefore, in such prior seals, provision is sometimes made for take-up of pressure upon the O-ring, but this only serves to rebuild temporarily the seal's ability to retain pressure, although at the same time to increase the tendency to cold flow, after which further cold flow of the Teflon and weakening of the force of the O-ring again lessens the effectiveness of the seal. Such seals are also subject to pinching of the two rings, as in the type first described. Such effects are noted especially when these seals are subject to wide variations of temperature and pressure, and to adverse operating conditions, such as the presence of dust or like abradants or contaminants.

The seal of this invention uses a Teflon ring and a standard O-ring of elastomeric material, but related each to the other in a new way, the Teflon ring being per se of novel form, and the two related in a novel way to the groove or recess wherein they are installed, and to the clearance between the two relatively movable parts to be sealed. The relationship is such that neither ring is subject to extrusion, nor, hence, to pinching off.

It may be assumed that operating conditions are such that the rod 3 is guided for reciprocation axially within a surrounding housing 4, and that the seal between them may be subject to pressure at the right and towards the left up to 3000 p.s.i. or more, at temperatures varying from —65° F. upwardly to 160° or higher, with leakage assumed to be at a rate not in excess of one drop of hydraulic fluid in five minutes, even though subjected to 50,000 full-stroke cycles or 5,000,000 short-stroke cycles at a rate of 600–700 c.p.m., and under adverse operating environments, such as sand and dust, or moisture, externally applied. These limits have been exceeded in actual tests, with the seal of this invention.

The first ring 1 is formed with a thin, elongated and integral sleeve 10, the outer circumference 11 whereof is angled, in cross section, at a small acute angle relative to the continuous internal circumference of the ring 1 and its sleeve 10. This acutely-angled surface 11 preferably extends from a thin edge at its smaller end, at the high pressure (right) side of the seal, to the vicinity of the midpoint of the length of the ring 1, and there is joined by a fillet 16 of large radius of curvature to a flange portion 17 which is relatively thick in the axial direction, and formed with an abrupt shoulder 12, which preferably lies in a plane perpendicular to the axis, and extends to the inner circumference of the receiving recess 41. At its low pressure (left) end the flange portion of ring 1 is formed, preferably, with end surface 13 which slopes at a large acute angle with respect to the ring's inner circumference or bore, towards the midpoint, or its high pressure end. This surface 13 preferably extends without substantial interruption from the ring's inner circumference to its outer circumference. The smaller (right) end of the ring 1 might be a feather edge, except as the same would then be subject to deformation in handling and packing. The O-ring 2 completes the seal, and cooperates with the ring 1 and the recess 41, and with the clearance space at 53, in a manner about to be explained. The sealing structure is installed by inserting the O-ring 2 within the open end of recess 41, inserting ring 1 in the recess, and urging the ring 1 axially by threading the backing member 5 at 54 into the recess; the sleeve 10 enters and deforms the O-ring, until the member 5 bottoms at 52. The backing element 5 when correctly installed is fully threaded in at 54 until it bottoms at 52 with respect to the housing 4. This leaves the recess 41 of precise volume, related to the volume of rings 1 and 2. Backing element 5 has its end 51 which abuts the Teflon ring 1 sloped complementarily to the slope at 13 of that ring 1. The ring 1, then, occupies a given volume within the recess 41, leaving a residual and nonvariable volume predetermined by the design, and related to the volume of the elastomeric ring 2. The ring 2 is designed to be deformed, but only to a given extent, and when deformed has well-rounded corners. So deformed it occupies, say, 85% of the fixed residual volume (plus or minus 10% of its intended area), and thereby, as it tends to resume its initial round cross section, it produces a substantially constant force directed both radially and axially. It is this force which acts upon the Teflon ring 1.

The ring 2 has no tendency to roll, for it is a static seal only, and its deformation is only sufficient to leave it with well-rounded corners which do not fit closely wherever there is clearance (as at 53), hence there is no starting point for its extrusion. The ring is confined axially between end surface 40 of the recess and shoulder 12 of the ring 1 and urges the ring 1 with constant force toward the backing member 5. The sloped surfaces 13 and 51 give this axial pressure a radially inward component, urging the heel 15 of the ring 1 against the rod 3. The ring 2 is also confined radially between the bottom of recess 41 and the thin sleeve 10 of the ring 1, and this induces radially inward pressure of constant value of the sleeve 10 against the rod, as well as effecting a static seal of the ring 2 with respect to the bottom of the recess or groove 41. The radially inward pressures of ring 1 and its sleeve 10 upon the rod effect a primary dynamic seal of low frictional resistance, since Teflon has a low frictional coefficient relative to metal. The force upon ring 2 may increase due to access of system pressure from time to time by way of clearance 53, but this will not produce extrusion of ring 2 into any clearance space, for reasons already given, and only increases the force ring 2 applies to ring 1 at the times when increase of force may be required to ensure sealing.

Neither does the force applied to Teflon ring 1 by ring 2 induce extrusion of the ring 1 such as could materially affect its ability to seal, nor to an extent to alter the area relationship of ring 2 to recess 41, and consequently the predetermined force of the deformed ring 2. The reason for this is that the clearance at 35 is minimal, say .002″ in the example given, the bulk of the ring 1 is a maximum at its heel 15, adjoining clearance 35, and the angle at 15 is large. All such factors preclude extrusion from cold flow. While the pressure of the heel into the angle between the rod and sloped surface 13 is produced by pressure of the ring 2 against ring 1, and constitutes the secondary dynamic seal, pressure of the bore of sleeve 10 radially against the rod 3 is substantial and because of the thinness of sleeve 10 and details of its structure to be explained later, constitutes the primary dynamic seal, and may lessen the force required at the secondary seal to maintain the seal as a whole against leakage. It follows that the great mass of Teflon at 15, adjacent the small clearance at 35, has little or no tendency to extrude into the clearance. There being no other point on ring 1 where extrusion is likely to occur, the ring 1 is not subject to erosion nor to breakdown. Absent any tendency to lessen the area of the cross section of ring 1, or of ring 2, the initial force of ring 2 remains unchanged.

Catastrophic failure has been mentioned above. This can be defined as a failure suddenly occurring, whereby all system pressure, and the pressure fluid supply, are lost in a matter of seconds. Obviously, should this occur all actuators in the system become inoperative; operation of controls, etc. can be effected, if at all or in time, by emergency manual means. The results may be catastrophic. The cause of such failures, in prior seals, is generally a localized pinching of the O-ring, or extrusion of the Teflon ring followed by pinching off of the skirt so formed, until in either case the pressure fluid blows out. In the present sealing structure the O-ring 2 is so located and so related to the recess wherein it is received (in other words, it has no tendency to roll, and it can not be so squeezed as to tend to approach clearance spaces) that there is no tendency to pinch it off. It is static within the recess, and constitutes a static seal only. The Teflon ring 1 has its heel 15 adjoining the clearance 35, but at this point it is of maximum bulk and its angle is quite large, and the clearance is minimal. The large bulk is not so much urged toward the clearance 35 by direct pressure from the ring 2, as by the radial component of axial pressure developed by interaction of sloped surfaces 13 and 51. Moreover, the clearance at 35 being so small, and the tendency of the bulky heel to cold flow so slight, that in practice there is no appreciable extrusion, nor in consequence any appreciable diminution of the area of the ring 1 or of the area relationship between rings 1 and 2 and recess 41. Even if extrusion were to occur at 35 it could never proceed to the point of blowout, because of the large bulk of heel 15. The force of ring 2 therefore remains constant throughout its life.

The Teflon ring 1 is slightly resilient, so that axial pressure of sloped surface 13 against surface 51 tends to squeeze the ring 1 into the angle of these surfaces with the surface of the rod 3, and to produce a tight dynamic seal between the ring 1 and the rod 3. Radial pressure of ring 2 against surface 11 tends to press the inner circumference of ring 1, particularly throughout the length of the sleeve 10, tightly against the surface of rod 3, to produce another dynamic seal, and the rather slight axial component of reaction of ring 2 at inclined surface 11 assists the direct axial pressure of ring 2 on the flange 17. Outward radial pressure of ring 2 against the internal circumference of the recess, and against the surface 11 of ring 1, effects a tight static seal. Any cold flow that might occur in the Teflon ring 1 would be minimal, and the residual pressure in the elastomeric ring 2 will persist at approximately its initial value, and compensate for such minimal cold flow over long periods of time.

Figure 2:
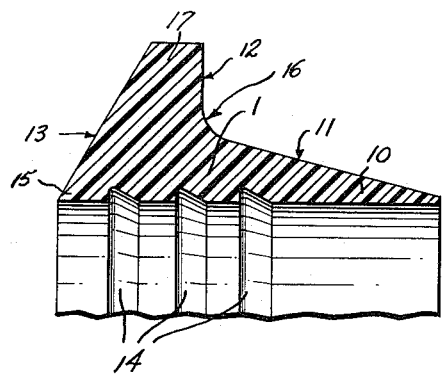
FIGURE 2 is a like view of the Teflon ring of such a seal, separate from the remainder.

It is preferred, but not essential, that the ring 1 be grooved circumferentially about its internal circumference, at axially spaced intervals, as shown at 14, by a serrated series of grooves and intervening lands which bear upon the rod's surface. It is preferred, also, that at least one such groove should be in the sleeve portion 10. One effect of such grooves is to multiply the effective pressure at the interfaces between the ring 1 and the rod 3 (as is required of an effective seal), by applying the existing pressure upon the entire ring over areas lessened by the area of the grooves. At the same time the breakaway force is moderate, for Teflon is a material having a low frictional coefficient. In the sleeve portion a groove or grooves adds flexibility, and causes the same to fit more closely about the rod without necessarily producing cold flow. Contaminants, abradants, intruding lubricants, etc. on the surface of the rod will collect in these grooves, before they injure the rod's surfaces or pass into the actuator cylinder, but by forming the grooves with abrupt shoulders facing the high pressure end, and sloping surfaces at their opposite sides (see FIGURE 2) they serve to scrape, cleanse, and collect such particles or lubricants more readily. They serve also as a pressure drop labyrinth seal. Additionally, they create a tread surface at the lands, whereby to increase sealing integrity and to control wearing life of the seal. The grooves also tend to break up any hydrodynamic film of lubricant before it can carry past the innermost groove, and produce leakage.

The seal may take other forms. For one, it may be doubled, and the two halves opposed, to seal against pressure alternatively applied from opposite sides, as in a two-way actuator. Such a doubled form is shown in FIGURE 4, and differs from the form already described primarily in that the backing element 5', intermediate the two sealing structures, is a ring shiftable axially within the recess 41', and is formed with two sloped surfaces 51' for cooperation with the complemental surfaces 13'. Nevertheless, the area of recess 41' is calculated in such manner that it is filled by the two rings 1 and the two rings 2, plus the ring 5', to the percentage required to deform the rings 2 and produce thereby the intended force applicable to the rings 1, but not to deform the rings 2 past the shape hereinabove specified.

Another form, a somewhat rudimentary one, lacking certain advantages of the preferred form of FIGURE 1, is shown in FIGURE 3. The Teflon ring 1" is substantially of L-shape in cross section, the ring 2 being the usual O-ring and seating upon the sleeve 10" of the ring 1". The end surface 13" of the ring 1" is not necessarily sloped, but abuts a complemental surface of the backing member 5 which bottoms at 52, as before. A pusher ring 6, urged towards the O-ring 2 by the force of a spring 50 reacting from the bottom 40 of the recess 41, deforms the O-ring to the desired extent. The grooves 14" serve somewhat the same puposes as grooves 14 in the preferred form. Clearance at 35" should be kept to a minimum, as at 35. In this form it is the constant pressure of spring 50 that is reflected in the constant force in the O-ring 2, and applied to the Teflon ring 1. The massive heel at 15" precludes material cold flow of ring 1" into the minimal clearance at 35". This form lacks some of the flexibility and other properties of the preferred form, and is less suitable for use where great accuracy and highest qualities are required, yet it can be made at lower cost and so may be suitable where cost is a factor to be considered.

Any of the forms described may be adapted to the sealing of a piston within its cylinder. In such a case, referring to FIGURE 1 as an example, the recess 41 would represent a circumferential groove about the piston, and the rod 3 would be replaced by the wall of the cylinder's bore. When reference is made in the claims to a housing and a rod movable therein, it must be borne in mind that such language is intended to include the reverse arrangement, wherein the housing would become the piston, and the rod the enclosing cylinder.

The Teflon used in ring 1 might be virgin Teflon, or it might be a filled Teflon. One type of filled Teflon would itself lessen any tendency to cold flow. Another type, filled with graphite, would withstand temperatures as high as could be withstood by the elastomer of which ring 2 is formed.

The seal of this invention in the form of FIGURE 1, in tests comparing it with other seals, has shown markedly improved results. For comparison, a seal consisting of a standard O-ring with two back-up rings in a standard groove, such as is in predominant usage at present, when tested under conditions corresponding to normal usage, failed after some 1100 flight-hours. A V-type Teflon ring, backed by an O-ring within its groove, when tested after cold-soaking the actuator containing it for four hours at −65° F., and testing for leakage at 20, 500, 1000, 2000, and 3000 p.s.i., was cycled through 25,000 full-stroke (6 inch) cycles in an ambient temperature of 160° F. The cold-soaking and leakage operations were then repeated, and the 25,000 cycle test was repeated in a sand and dust environment at ambient temperature. Impermissible leakage occurred about the outside periphery of the Teflon ring at low temperature, notwithstanding an initial interference fit. A Teflon channel seal with standard O-ring in a standard groove, such as is currently in limited use, gave improved results, up to 3800 flight-hours, or perhaps three and one-half times the life of the standard O-ring seal, but still afforded impermissible leakage when the 25,000 cycle stage in sandy environment was reached. Like tests with the seal of this invention were carried far beyond the stages where the previous seals failed, continuing on past a larger number of cycles, further cold-soaking, and recycling with moist air blown onto the rod at −65° F., and past five million short-stroke cycles at room ambient temperature. Its useful life proved to be some 10,650 flight-hours, or about nine times that of the standard O-ring seal, and at least four times that of the second seal, despite the additional and more rigorous test conditions.

I claim as my invention:

1. A seal assembly for sealing between a housing and a rod movable relative to the housing, the housing and rod being cooperatively formed to define a recess having two axially spaced end walls and two radially spaced walls, of which radially spaced walls the rod surface constitutes one wall and the opposite housing surface constitutes the second wall, said recess being of given cross-sectional area, said seal assembly comprising a Teflon ring of substantially unchanging cross-sectional area, and formed with a single flange portion abutting a first end wall of the recess, and with a single thin sleeve bearing closely upon that one of the radially spaced walls that moves relatively to the recess, said first end wall being disposed at a wide acute angle to said one radially spaced wall, and the abutting flange portion of the Teflon ring being complementally angled, said Teflon ring occupying such part of the cross-sectional area of the recess as to leave therein a substantially unchanging residual area that has four angles, and a resiliently deformable elastomeric O-ring bearing radially upon the sleeve of the Teflon ring and axially upon the flange of the same, to fill the angle between them, said O-ring being of a cross-sectional area such that it is deformed when received within the residual area of the recess, and when so deformed nearly fills that residual area and bears upon the flange portion of the Teflon ring and upon the opposite second end wall of the recess, and upon the sleeve of the Teflon ring and the opposite second radially spaced wall of the recess, but is rounded at the other three angles of the residual area, to space the O-ring from the possibility of pinching at any such angle.

2. A seal assembly for sealing between a housing and a rod movable relative to the housing, the housing and the rod being cooperatively formed to define a recess having two axially spaced end walls and two radially spaced walls, of which radially spaced walls the rod surface constitutes one wall and the opposite housing surface constitutes the second wall, said recess being of given cross-sectional area, said seal assembly comprising two Teflon rings of substantially unchanging cross-sectional area coaxially disposed within the recess, and an axially shiftable backing ring interposed between their adjacent ends, each Teflon ring being formed with a single flange portion abutting the respective faces of the backing ring and with a single thin sleeve bearing closely upon that one of the radially spaced walls that moves relatively to the recess, the abutting faces of the two Teflon rings and of the backing ring being disposed at a wide acute angle to that radially spaced wall of the recess whereon the sleeves of the Teflon rings bear, and the two Teflon rings being of a size to occupy such portion of its part of the cross-sectional area of the recess as to leave therein a substantially unchanging residual area that has four angles, and a resiliently deformable elastomeric O-ring bearing radially upon the sleeve of each Teflon ring and axially upon the flange of the same, to fill the angle between them, and each of a cross-sectional area such that it is deformed when received within its residual area, and when so deformed in addition to filling the angle between the flange and the sleeve of its Teflon ring it nearly fills such residual area and bears upon the flange portion of the Teflon ring and upon the opposite end wall of the recess, and upon the sleeve of the same Teflon ring and the opposite radially spaced wall of the recess, but is rounded at the other three angles of its residual area, to space the O-ring from the possibility of pinching at any such angle.

References Cited by the Examiner
UNITED STATES PATENTS

| | | | |
|---|---|---|---|
| 1,215,833 | 2/1917 | Mason et al. | 277—207 X |
| 2,643,147 | 6/1953 | Funkhouser et al. | 277—212 X |
| 2,831,714 | 4/1958 | Thorburn | 277—112 |
| 2,857,184 | 10/1958 | Mancusi | 277—165 |
| 2,935,365 | 5/1960 | Dega | 277—173 X |
| 2,998,987 | 9/1961 | Taschenberg et al. | 277—175 X |
| 3,011,803 | 12/1961 | Buckner et al. | 277—188 X |
| 3,096,096 | 7/1963 | Banks | 277—188 X |

FOREIGN PATENTS

| | | |
|---|---|---|
| 320,339 | 10/1924 | Great Britain. |
| 630,024 | 10/1949 | Great Britain. |
| 759,233 | 10/1956 | Great Britain. |
| 843,562 | 8/1960 | Great Britain. |

LAVERNE D. GEIGER, *Primary Examiner.*

LEWIS J. LENNY, SAMUEL ROTHBERG, *Examiners.*